(12) United States Patent
DiSantis et al.

(10) Patent No.: US 9,874,075 B2
(45) Date of Patent: Jan. 23, 2018

(54) ELECTROMAGNETIC INDUCTION GENERATOR FOR USE IN A WELL

(71) Applicant: Marathon Oil Company, Houston, TX (US)

(72) Inventors: Joseph R DiSantis, Houston, TX (US); David T Gerdeman, Oklahoma City, OK (US)

(*) Notice: Subject to any disclaimer, the term of this patent is extended or adjusted under 35 U.S.C. 154(b) by 0 days.

(21) Appl. No.: 14/878,217

(22) Filed: Oct. 8, 2015

(65) Prior Publication Data
US 2016/0102529 A1    Apr. 14, 2016

Related U.S. Application Data

(60) Provisional application No. 62/063,257, filed on Oct. 13, 2014.

(51) Int. Cl.
| | | |
|---|---|---|
| *H02K 5/132* | (2006.01) | |
| *E21B 41/00* | (2006.01) | |
| *E21B 4/04* | (2006.01) | |
| *E21B 43/00* | (2006.01) | |
| *H02N 1/00* | (2006.01) | |
| *H02K 7/18* | (2006.01) | |

(52) U.S. Cl.
CPC ......... *E21B 41/0085* (2013.01); *H02K 5/132* (2013.01)

(58) Field of Classification Search
None
See application file for complete search history.

(56) References Cited

U.S. PATENT DOCUMENTS

| | | | | |
|---|---|---|---|---|
| 8,033,328 B2* | 10/2011 | Hall | ............... | E21B 41/0085 |
| | | | | 166/65.1 |
| 8,511,373 B2* | 8/2013 | Tosi | ............... | E21B 41/0085 |
| | | | | 166/65.1 |
| 8,528,638 B2* | 9/2013 | Dong | ............... | E21B 43/26 |
| | | | | 166/263 |
| 9,041,230 B2 | 5/2015 | Arnold et al. | | |
| 9,155,185 B2 | 10/2015 | Reijonen et al. | | |
| 9,206,672 B2* | 12/2015 | Cooley | ............... | E21B 41/0085 |
| 2008/0296984 A1 | 12/2008 | Honma et al. | | |
| 2009/0133867 A1* | 5/2009 | Kuckes | ............... | E21B 41/0085 |
| | | | | 166/65.1 |
| 2010/0194117 A1 | 8/2010 | Pabon et al. | | |

(Continued)

OTHER PUBLICATIONS

Halbach, K.; "Design of Permanent Multipole Magnets with Oriented Rare Earth Cobalt Material"; Nuclear Instruments and Methods 169; 1980; pp. 1-10; North-Holland Publishing Co.

(Continued)

*Primary Examiner* — Matthew R Buck
*Assistant Examiner* — Douglas S Wood
(74) *Attorney, Agent, or Firm* — Jack E. Ebel

(57) ABSTRACT

An electromagnetic induction generator for use in a tubular, such as a tubular deployed in a subterranean well during wellbore construction operations, for generating electric current through electromagnetic induction. The electromagnetic induction generator has at least one conductive coil and at least one Halbach array of magnets. One or both of the at least one conductive coil and the at least one Halbach array of magnets is rotated relative to the other to increase the electric current generated. One or more gears may be provided to multiply the generated electric current.

14 Claims, 7 Drawing Sheets

(56) References Cited

U.S. PATENT DOCUMENTS

| | | |
|---|---|---|
| 2011/0114830 A1 | 5/2011 | Reijonen et al. |
| 2011/0140458 A1 | 6/2011 | Arnold et al. |
| 2012/0273235 A1 | 11/2012 | Tosi et al. |
| 2013/0026978 A1 | 1/2013 | Cooley et al. |
| 2015/0198222 A1* | 7/2015 | Klassen ............... H02N 2/105 74/25 |

OTHER PUBLICATIONS

Halbach, Klaus; "Physical and Optical Properties of Rare Earth Cobalt Magnets"; Nuclear Instruments and Methods 187; 1981; pp. 109-117; North-Holland Publishing Company.

Halbach, Klaus; "Perturbation Effects in Segmented Rare Earth Cobalt Multipole Magnets"; Nuclear Instruments and Methods 198; 1982; pp. 213-215; North-Holland Publishing Company.

Electrical Engineering Stack Exchange; Explanation for Differing Stator Winding Orientations; Oct. 23, 2012; pp. 1-3; available at www.electronics.stackexchange.com/questions/45314/explanation-for-differing-stator-winding-orientations.

Colton, Shane; LEAF Motor: Spin-Up; Mar. 16, 2010; pp. 1-3; available at www.scolton.blogspot.com/2010/03/leaf-motor-spin-up.

Colton, Shane; LEAF Motor: Assembly Box of Doom + Back EMF; Mar. 4, 2010; pp. 1-4; available at www.scolton.blogspot.com/2010/03/leaf-motor-assembly-box-of-doom-back.

Colton, Shane; LEAF Motor Blitz: Everything but the Windings.; Feb. 19, 2010; pp. 1-4; available at www.scolton.blogspot.com/2010/02/leaf-motor-blitz-everything-but.

Colton, Shane; Thought Exercise: The LEAF Motor; Feb. 4, 2010; pp. 1-4; available at www.scolton.blogspot.com/2010/02/thought-exercise-leaf-motor.

Colton, Shane; EAM: Single-Winding Back EMF Test; Jan. 28, 2010; pp. 1-2; available at www.scolton.blogspot.com/2010/01/eam-single-winding-back-emf-test.

Colton, Shane; Epic Axial Motor—IAProgress; Jan. 24, 2010; pp. 1-6; available at www.scolton.blogspot.com/2010/01/epic-axial-motor-iaprogress.

Colton, Shane; Epic Axial Motor: Epic Axial Update; Nov. 8, 2009; pp. 1-6; available at www.scolton.blogspot.com/2009/11/epic-axial-motor-epic-axial-update.

HAPPY2THINK; Wiring the Coils in 3 Phases Axial Flux Generators; Apr. 30, 2012; pp. 1-2; available at www.instructables.com/id/wiring-the-coils-in-3-phases-axial-flux-generators/step3/the-complete-wiring.

* cited by examiner

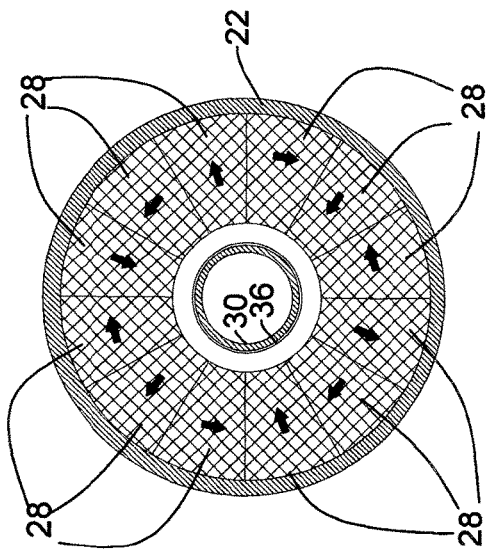
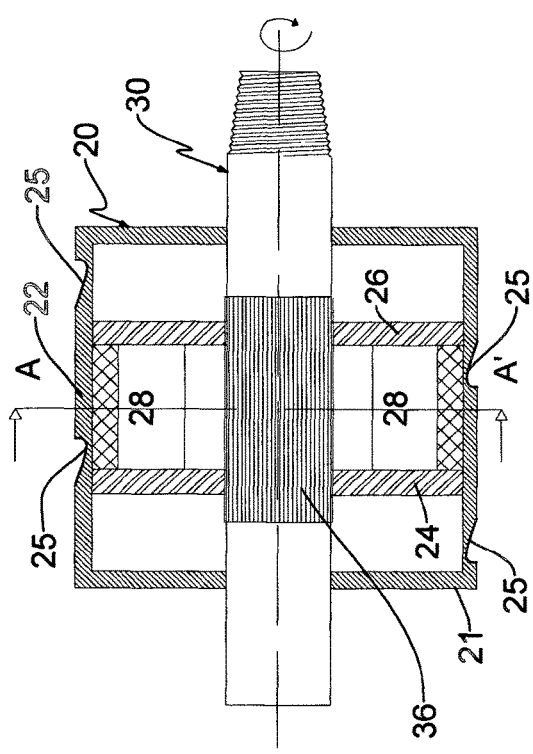
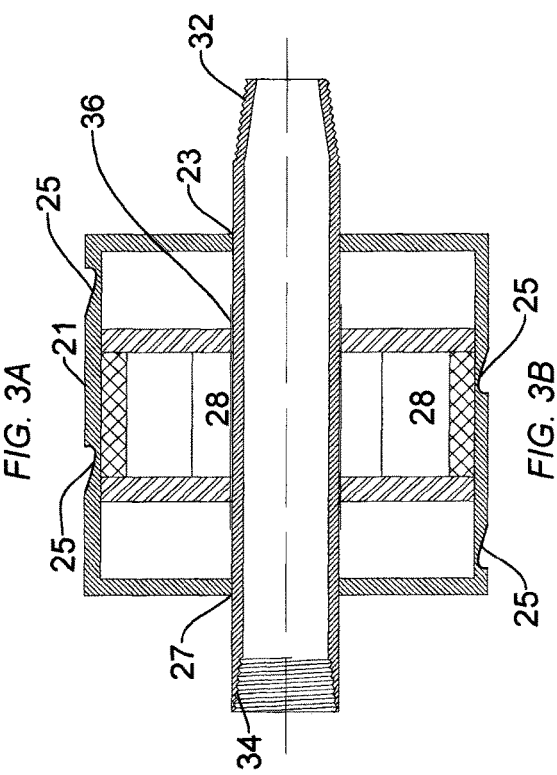

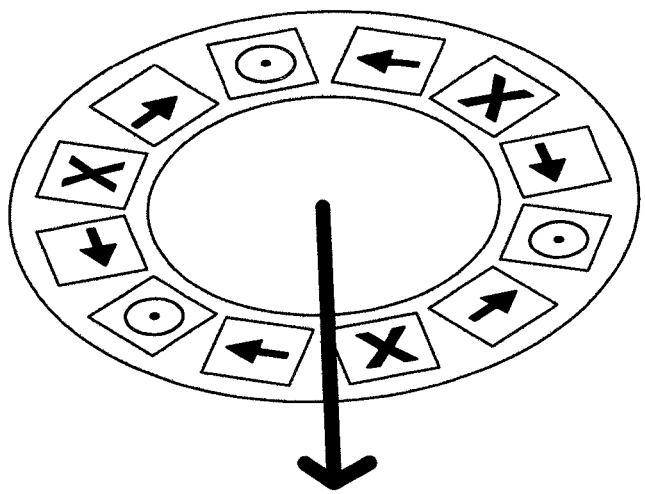
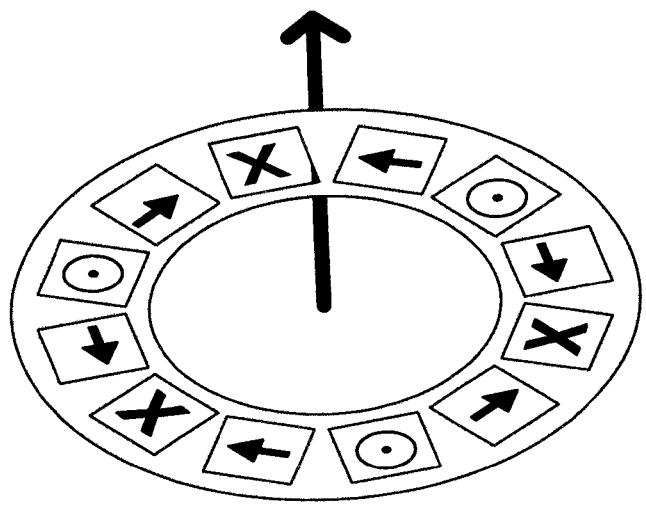
FIG. 4

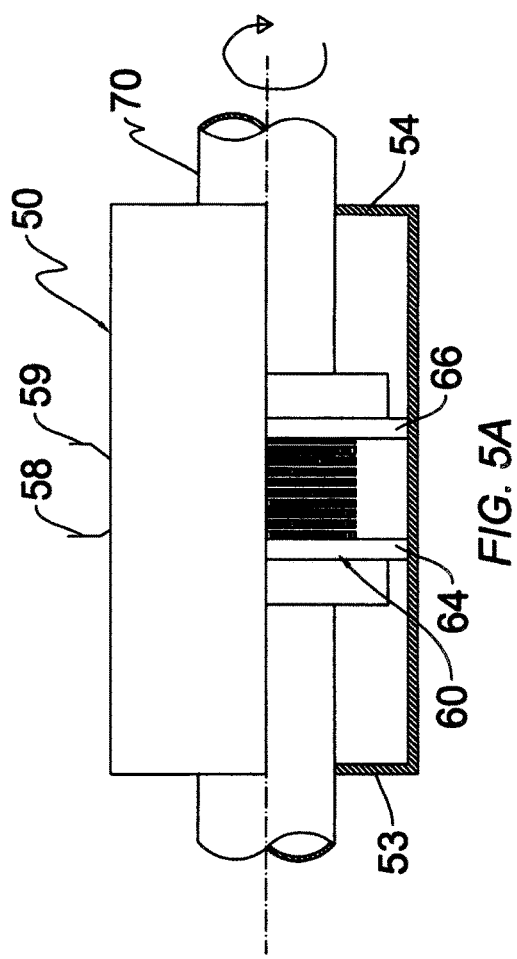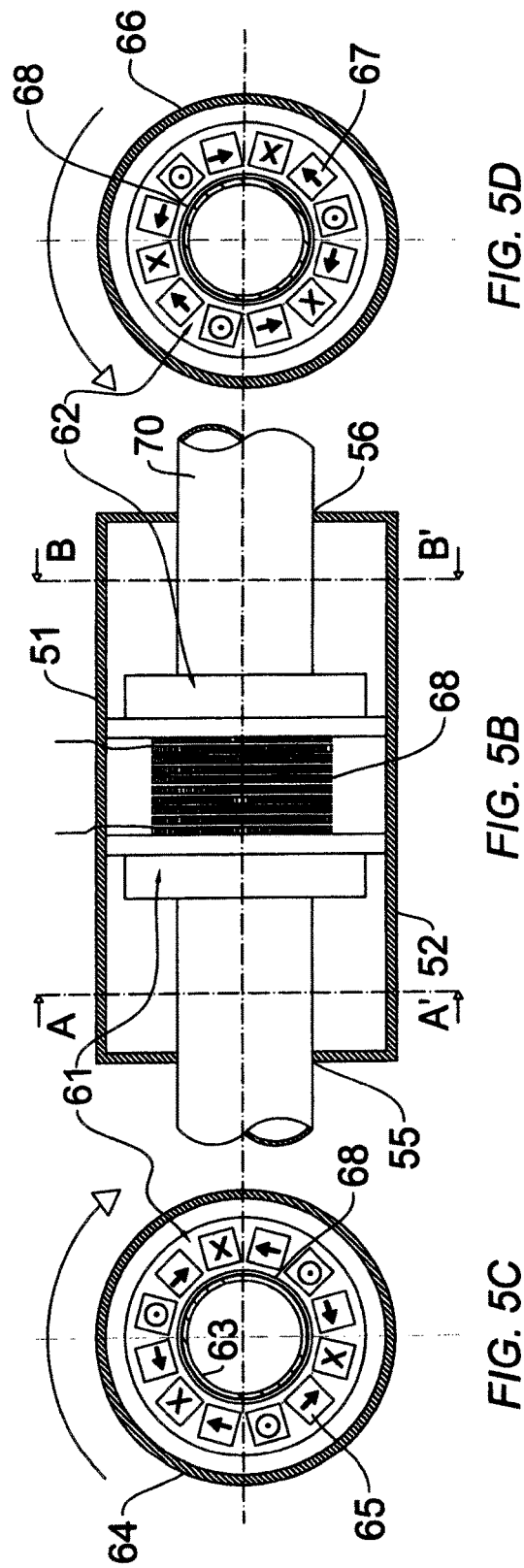

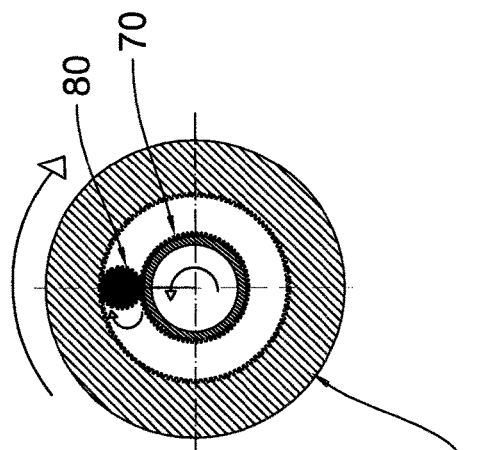
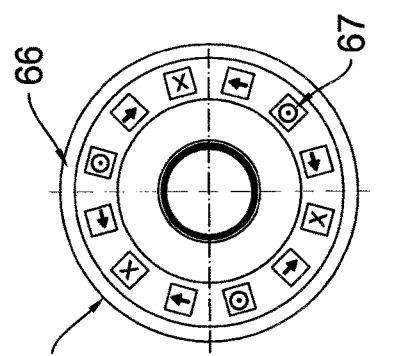
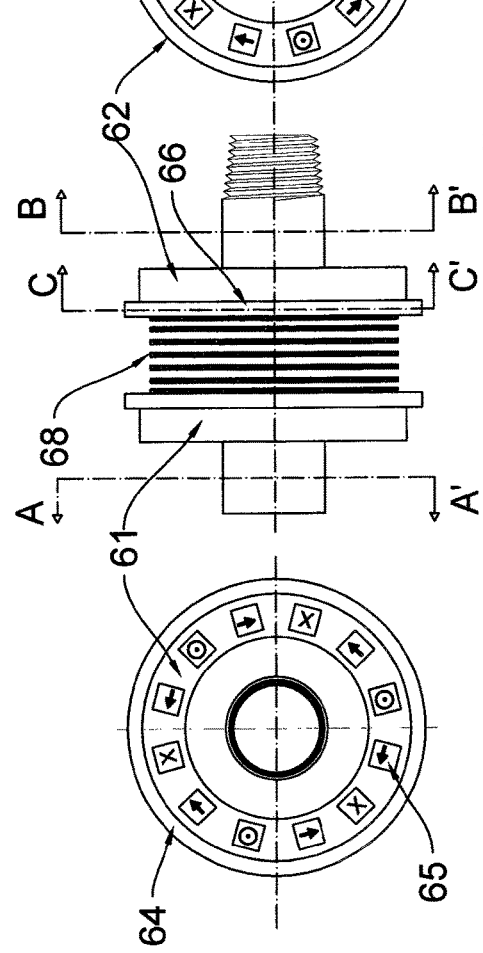
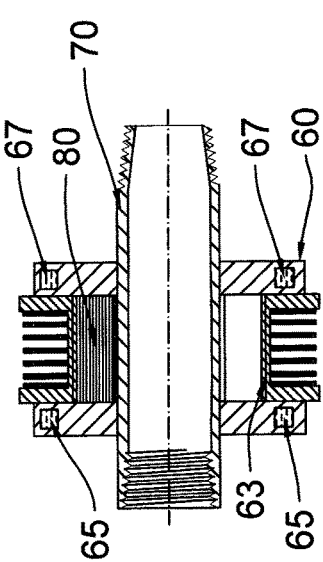

ELECTROMAGNETIC INDUCTION GENERATOR FOR USE IN A WELL

BACKGROUND OF THE INVENTION

The present invention relates generally to an electromagnetic induction generator for use in a tubular, such as a tubular deployed in a subterranean well, and, in one or more embodiments, to such an electromagnetic induction generator wherein one or both of at least one conductive coil and at least one Halbach array of magnets is rotated relative to the other to increase the electric current generated through electromagnetic induction.

As downhole tools used to perform wellbore construction operations for oil and gas wells are becoming more sophisticated, these tools require increased electrical power to operate ancillary systems, such as electronics and on-board control mechanisms. An example is rotary steerable systems that are used to drill wells directionally. If a tool is mechanically reliable, the operational lifespan thereof prior to servicing is typically limited by the life of the battery used to power the tool while in the well bore. Therefore, it is desirable to extend the life of such tools in order to utilize their functionality during longer stretches of wellbore construction, and to avoid unnecessary and expensive trips in/out of the well bore to replace or recharge batteries.

Existing downhole electrical power generators that use fluid-driven turbines are not ideal because of the inherent fluid pressure drop associated with using a fluid turbine. As an alternative to fluid driven turbines, batteries, such as lithium batteries, were introduced to power downhole equipment. However, such batteries must be replaced or recharged. Accordingly, such a battery may be removably mounted so that when it is determined that the stored power is running low, the battery can be removed and replaced by with a fully charged battery. Alternatively, the battery may be rechargeable and arranged to be charged in situ. For example, the battery can be recharged using an electrical cable lowered from the surface, when required, and connected to the battery 30. Alternatively, it may be recharged using a wired drill pipe link in the drill string connected to a power source located at the surface or elsewhere. If for any reason the battery cannot be charged in situ, then the tool assembly containing the drained battery will often need to be pulled from its downhole location and replaced at the well head, which can be time-consuming and expensive.

Accordingly, a need exists for assemblies and processes for generating electricity to power downhole equipment, to recharge batteries used in a downhole environment or for both reasons when performing wellbore construction operations, such as drilling operations and certain completion operations, for example a completion operation wherein one or more plugs are drilled out of a well, that does not require tripping equipment in/out of the well, nor energy conveyed from the surface of the earth.

BRIEF SUMMARY OF THE INVENTION

To achieve the foregoing and other objects, and in accordance with the purposes of the present invention, as embodied and broadly described herein, one characterization of the present invention is a process comprising positioning an electromagnetic induction generator comprising a conductive coil and at least one Halbach array of magnets within a subterranean well bore. The conductive coil, the at least one Halbach array of magnets or both the conductive coil and the at least one Halbach array of magnets are rotated to produce an electric current.

Another characterization of the present invention is an assembly for use in a well comprising: a housing having axially aligned openings therethrough; a tubular capable of being rotated and positioned through the housing via the aligned openings; two Halbach arrays of magnets positioned within the housing to create an internal magnetic field; and a conductive coil positioned on the exterior of the tubular within the housing and the internal magnetic field. Each Halbach array generates an axial magnetic field which is directed toward the other Halbach array so as to create the internal magnetic field which is generally cylindrically shaped.

A further characterization of the present invention is an assembly for use in a well comprising a housing having axially aligned openings therethrough; a tubular capable of being rotated and positioned through the housing via the aligned openings. The tubular has at least one first set of teeth extending about substantially the entire outer circumference thereof. At least one gear having a generally annular shape may be positioned within the housing and may have a second set of teeth extending about substantially the entire inner circumference thereof and meshing with the at least one first set of teeth when positioned between the housing and the tubular. At least one set of generally annular Halbach arrays may be positioned within the housing so as to be generally concentric with and secured to the at least one gear. A conductive coil may be positioned on the exterior of the tubular within the housing and the magnetic field.

BRIEF DESCRIPTION OF THE SEVERAL VIEWS OF THE DRAWINGS

FIG. 3A is a partially cutaway view of a sub for use in a drill string in accordance with an embodiment of the present invention;

FIG. 3B is a cutaway view of the sub of FIG. 3A;

FIG. 3C is a cross sectional view taken along the line A-A' of FIG. 3A;

FIG. 4 is a schematic view of a radial Halbach magnetic array;

FIG. 5A is a partially cutaway view of a sub for use in a drill string in accordance another embodiment of the present invention;

FIG. 5B is a cutaway view of the sub of FIG. 5A;

FIG. 5C is a cross sectional view taken along the line A-A' of FIG. 5B;

FIG. 5D is a cross sectional view taken along the line B-B' of FIG. 5B;

FIG. 6 is a perspective view of a sub for use in a drill string in accordance with still another embodiment of the present invention;

FIG. 6A is a cross sectional view taken along the line A-A' of FIG. 6;

FIG. 6B is a cross sectional view taken along line B-B' of FIG. 6;

FIG. 6C is a cross sectional view taken along line C-C' of FIG. 6;

FIG. 6D is a cutaway view of FIG. 6; and

DETAILED DESCRIPTION OF THE INVENTION

The processes and assemblies of the present invention may be practiced and deployed in a borehole which may be formed by any suitable means, such as by a rotary drill string, as will be evident to a skilled artisan. As used throughout this description, the term "borehole" is synonymous with wellbore and means the open hole or uncased portion of a subterranean well including the rock face which bounds the drilled hole. A "drill string" may be made up of tubulars secured together by any suitable means, such as mating threads, and a drill bit secured at or near one end of the drill string. In some instances, the tubulars may be casing. The borehole may extend from the surface of the earth, including land, a sea bed or ocean platform, and may penetrate one or more environs of interest. As used throughout this description, the terms "environ" and "environs" refers to one or more subterranean areas, zones, horizons and/or formations that may contain hydrocarbons. The borehole may have any suitable subterranean configuration, such as generally vertical, generally deviated, generally horizontal, or combinations thereof, as will be evident to a skilled artisan. Typically, a drilling rig is positioned at the surface and includes draw works, a top drive and mud pumps, among other equipment. The draw works of a drilling rig is a machine which primarily reels the drill string in and out of the borehole and thereby controls the weight on bit. The top drive is a device that turns the drill string and thereby controls revolutions per minute ("RPM") thereof. The mud pump circulates drilling fluid under high pressure down the drill string and up the annulus between the drill string and the borehole to the drilling rig and thereby controls the drilling fluid circulation rate.

Figure 1:
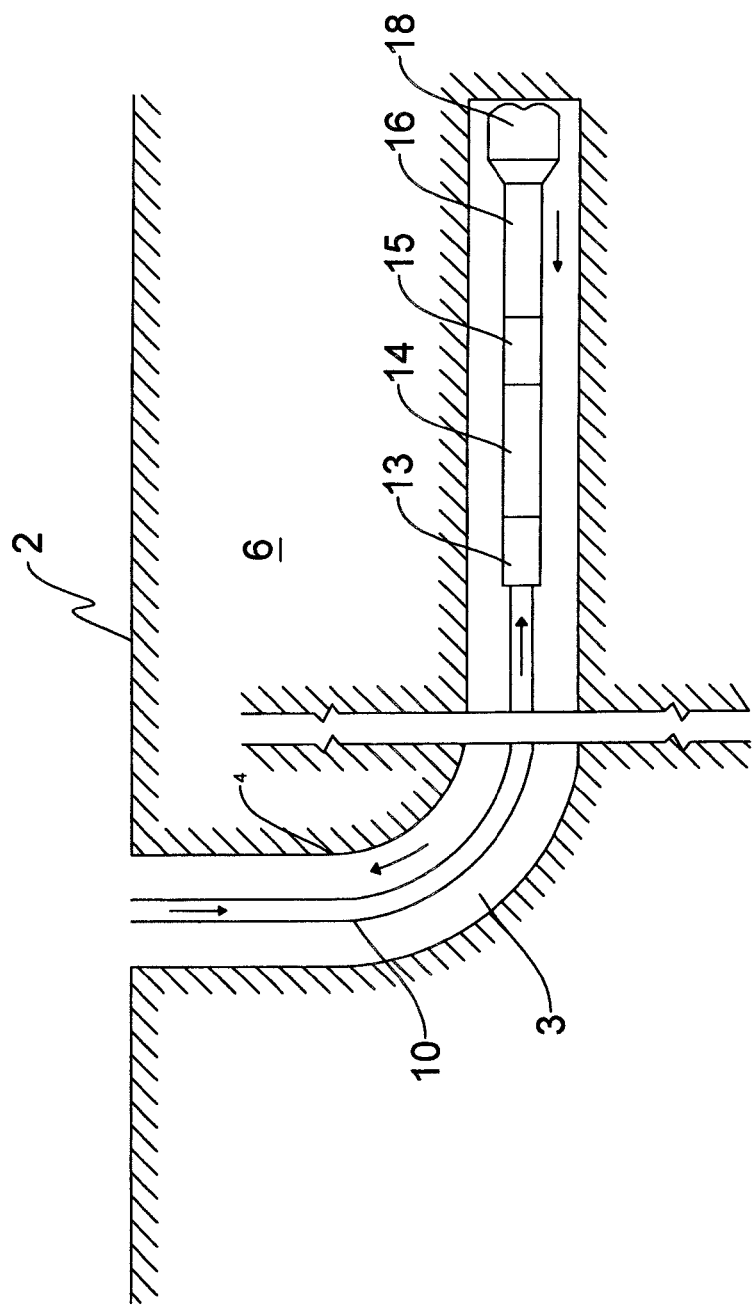
FIG. 1 is a partially cutaway perspective view of a drill string as deployed to drill a subterranean well bore.

As illustrated in FIG. 1 and in accordance with conventional practice, a drill string 10 may be rotated by a drilling rig (not illustrated) situated at the surface 2 to form a borehole 4 in the earth 6. Drill string 10 may be made up of tubulars secured together by any suitable means as will be evident to a skilled artisan, for example by mating, threaded male and female ends, and has a suitable drill bit 18 secured to one end thereof. Bottomhole assemblies 14 and 16 may also be included near one end of the drill string and may include measurement while drilling (MWD) instrumentation, logging while drilling (LWD) instrumentation, or both to provide real time downhole measurements to the operators of the drilling rig. Such MWD and LWD instrumentation may measure gamma ray radiation, sonic velocities, porosity, density, resistivity, borehole azimuth, borehole inclination, pressures, temperature, weight on bit, revolutions per unit time, bending moments, vibration, shock and torque and may include a suitable means of communication to tools used to adjust borehole trajectory tools positioned within the bottomhole assembly. One or more electromagnetic induction generators of the present invention may also be included in the drill string. As illustrated in FIG. 1, two electromagnetic induction generators 13 and 15 may be included near one end of the drill string to directly power bottomhole assemblies 14 and 16, charge batteries within such assemblies or both. Although illustrated and described as being separate components of the drill string, it will be evident to a skilled artisan that the electromagnetic induction generators 13 and 15 may reside within the bottomhole assemblies 14 and 16, respectively. Drilling mud may be pumped from the surface by means of mud pump(s) through the drill string 10 to circulate rock cuttings to the surface 2 via the annulus 3 formed between the borehole 4 and drill string 10 (as indicated by the arrows in FIG. 1).

Figures 2A, 2B, 2C, 2D:
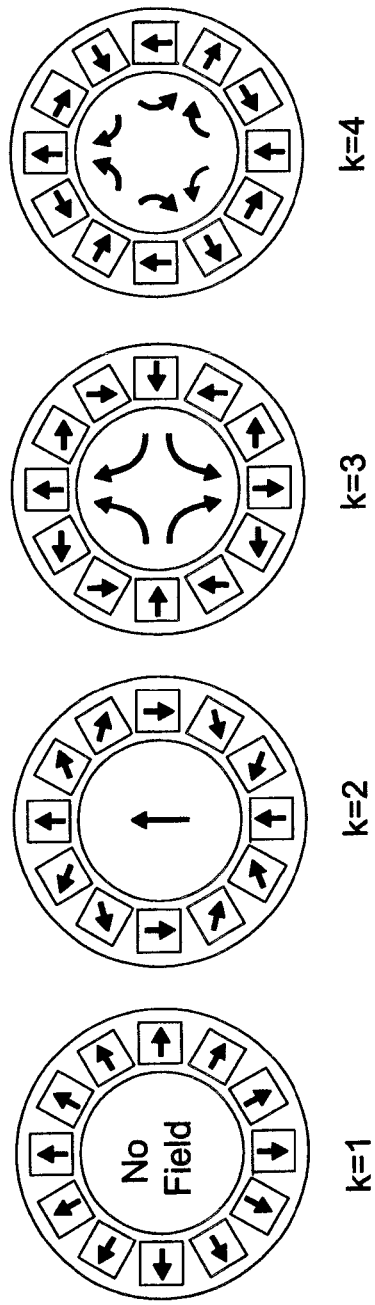
FIGS. 2A-2D are schematic views of a planar Halbach magnetic array in which the pole direction of each magnet within an array is oriented to create different magnetic fields.

A Halbach array denotes an arrangement of permanent magnets that augments the magnetic field on one side of the array while cancelling the field to near zero on the other side. A Halbach cylinder may be a magnetized cylinder composed of ferromagnetic material, i.e. permanent magnets, that produce an intense magnetic field confined entirely within the cylinder with substantially no field outside. The cylinders may also be magnetized such that the magnetic field is entirely outside the cylinder, with substantially no field inside. FIGS. 2A-2D show a "mathematically perfect" Halbach cylinder, where the magnetic pole direction continuously varies so that the magnetic flux produced inside the cylinder is perfectly uniform, as well as confined to the inside of the cylinder. The magnetic flux is the movement of the magnetic field through space. The arrow in each magnet of the arrays illustrated in FIGS. 2A-2D indicates the direction of the north pole of each magnet. By orienting the pole direction of each magnet within an array, different magnetic fields, either internal or external to a Halbach cylinder, may be created. For example, FIG. 2A shows no internal field pattern, where k=1; FIG. 2B shows a dipole internal field pattern, where k=2; FIG. 2C shows a quadrupole internal field pattern, where k=3; and FIG. 2D shows a hexapole internal field pattern, where k=4, where a positive value for k indicates an internal magnetic field, while a negative value for k indicates an external magnetic field. In the foregoing discussion, k is the spatial wavenumber, (i.e., the spatial frequency).

In accordance with the present invention, rotational energy which may occur downhole, such as via a rotating drill string during drilling of a subterranean well, may be converted to electrical energy production based upon the Faraday induction principle whereby changes, i.e., movement in magnetic flux through a coil induces an electric current through the coil. The changes in magnetic flux may be produced by relative rotational motion between at least one set of magnets in a Halbach array and at least one coil. As discussed below, the magnets in the Halbach array may rotate, the coil may rotate or both the Halbach array and the coil may rotate, preferably in opposite directions from each other.

Specific embodiments of the subject invention incorporate at least one conductive coil and at least one magnet array. Magnets used in such magnet arrays may be permanent magnets of various shapes, such as arc-shaped, square, rectangular, wedge, or trapezoidal. These magnet arrays may then be, for example, circular, hexagonal, rectangular, or square in external shape and create various types of internal magnetic fields, such as dipole, quadrupole, hexapole, or octapole magnetic fields.

Preferentially, the present invention may be configured in one or more downhole tools that have both a rotating section and a non-rotating section as or within a separate coupling joint that connects two sections, e.g. a bottomhole assembly to the drill string or another bottomhole assembly. The invention may leach rotational energy from the drill string, optionally assisted with a gearbox to increase the leaching effect, and may generate an electrical current that may be used to recharge downhole tool batteries or power other devices. Current may be passed to a capacitor or sent to ground when there is not a need for the leached energy. Alternatively, a battery powered switch may be configured such that when said battery can no longer hold the switch open the switch closes, completing a circuit that allows for stored charge from the capacitor or directly from the generator to pass through and charge the battery.

In accordance with one embodiment of the present invention as illustrated in FIGS. 3A-3C, an electromagnetic induction generator for use downhole is illustrated generally as 20 and may include a housing 22 of any suitable configuration, such as cylindrical. At least two substantially parallel walls 24, 26 of a suitable configuration, such as circular, may be positioned within housing 22 and spaced a substantially uniform distance from each other. The walls 22 may be secured to housing 20 by any suitable means, such as welds, or be formed integral with the housing. Opposing housing walls 22 may be formed with an axial bore 23, 27, respectively, through which a tubular 30 may be positioned. The ends of the tubular 30 may be provided with means, for example male and female screw threads 32, 34, for connecting the tubular within a string of tubulars, such as a drill string. The tubular may be provided with a conductive coil 36 on the exterior. Preferably, the conductive coil is secured to the tubular 30 by any suitable means and is positioned intermediate the length thereof. The conductive coil may be formed by any suitable material, such as copper, and by any suitable means, such as windings, as will be evident to a skilled artisan. Preferably, the conductive coil is oriented so that the windings are perpendicular to the magnetic field.

A plurality of magnets 28 may be arranged in a radial array as best illustrated in FIG. 3C so as to form a cylindrical Halbach array. The magnets 28 may be secured to the internal surface of housing 20, wall 24, wall 26 or any combination of the foregoing by any means, for example by an adhesive or by friction, as will be evident to a skilled artisan. The cylindrical Halbach array may have the north and south poles of adjacent magnets ordered in such a way to confine the entire magnetic field within the cylinder, i.e. to generate an internal magnetic field. Although the Halbach array is illustrated in FIG. 3C as having a spatial wavenumber (k)=4 (also illustrated in FIG. 2D), other spatial wavenumbers may be utilized when arranging magnets 28 to form the Halbach array so long as an internal magnetic field is generated. During operation of the assembly, such as a drill string, to which the electromagnetic induction generator 20 of the present invention may be secured to, the conductive coil 36 on tubular 30 is rotated with the tubular within housing 20 and within the internal magnetic field generated by the cylindrical array of magnets 28. The exterior surface 21 of housing 20 may be provided with helical or similarly configured grooved flow channels 25 which provide opposing resistance to drilling fluid flowing past the housing 20 and thereby providing torque and a rotational force to housing 20 in the opposing direction to that of the drill string and tubular 30 so as to inhibit concurrent rotation of housing 20 with tubular 30 or cause the housing 20 to rotate in an opposite direction than tubular 30.

This configuration would effectively place a rotating conductive coil within a confined magnetic field that may either be stationary or rotating in an opposite direction thereby creating an electrical current through electromagnetic induction. Each end of the coil may be connected as leads (not illustrated) to carry the electric current to a means of utilization or storage. This generated current may be used to recharge downhole tool batteries or power other devices. Current may be passed to a capacitor or sent to ground when the current is not needed. Alternatively, a battery powered switch (not illustrated) may be configured such that when a battery used in conjunction with a downhole assembly can no longer hold the switch open, the switch closes thereby completing a circuit that allows stored charge from the capacitor or directly from the generator to charge the battery.

Although illustrated as a separate component of a tubing string, the electromagnetic induction generator of FIGS. 3A-3C may be formed as part of downhole assembly or tool that it charges and runs, such as MWD and LWD assemblies.

FIG. 4 illustrates a cylindrical Halbach array, where the magnetization direction continuously varies so that the magnetic flux produced is directed axially outward from only one face of the array. The arrow in each magnet of the arrays illustrated in FIG. 4 indicates the direction of the north pole of each magnet.

In accordance with another embodiment of the present invention as illustrated in FIGS. 5A-5D, an electromagnetic induction generator for use downhole is illustrated generally as 50 and may include a housing 52 of any suitable configuration, such as cylindrical. As illustrated, the housing 52 may have an exterior surface 51 and two opposing end walls 53, 54 having axial and aligned bores 55 and 56, respectively, therethrough. A spool 60 may be positioned within housing 52 and may have two opposing, generally annular sides 64 and 66 secured together by a central cylinder 63 (FIGS. 5C and 5D) about which any suitable material, such as copper, may be wound in generally perpendicular line to magnetic fields and rotational motion so as to form a conductive coil 68. Generally annular sides 64, 66 and central cylinder 63 may be integrally formed or secured together by any suitable means, such as welds, as will be evident to a skilled artisan. Further, the annular sides may be secured to housing 52, by any suitable means, such as by welds. A pair a planar Halbach arrays 65 and 67 may be positioned within housing 52 such that one array 65 is positioned adjacent to annular side 64 of spool 60 while the other array 67 is positioned adjacent annular side 66. Each array 65, 67 may be secured within a structure 61, 62, for example a generally annular disc, and positioned so that the radially spacing of the array from the axis of tubular 70 as positioned through housing 52 is substantially equal to the radial spacing of conductive coil 68 from the axis of tubular 70. Each of the structures 61, 62 containing arrays 65, 67 may be secured to a tubular 70 which may be positioned through the annular bores 55, 56 through housing 52 and through the central core of spool 60 and a bore in each Halbach array 64, 66. The ends of the tubular 70 may be provided with means, for example male and female screw threads, for connecting the tubular 70 within a string of tubulars, such as a drill string.

A plurality of magnets 65, 67 may be arranged in each Halbach array 64, 66, respectively, as best illustrated in FIG. 4 and FIGS. 5C and 5D so as to form a cylindrical Halbach array having the north and south poles of adjacent magnets ordered in such a way to generate a magnetic field emanating axially from the internal face of each array as assembled within housing 52, i.e. toward conductive coil 68, to form a generally cylindrical shaped internal magnetic field. During operation, a rotating tubular, such as a drill string, to which the electromagnetic induction generator 50 of the present invention may be secured to, rotates tubular 70 and Halbach arrays 64 and 66. The conductive coil 68 within housing 52 may be placed within the internal magnetic field generated by the cylindrical array of magnets 65, 67 of arrays 64, 66. This configuration would effectively place a conductive coil within a confined rotating magnetic field creating an electrical current through electromagnetic induction. One end of the coil may be connected to leads 58, 59 to carry the electric current to a means of utilization or storage. This generated current may be used to recharge downhole tool batteries or power other devices. Current may be passed to a capacitor or sent to ground when the current is not needed. Alternatively, a battery powered switch (not illustrated) may be configured such that when a battery used in conjunction with a downhole assembly can no longer hold the switch open the switch closes, completing a circuit that allows stored charge from the capacitor or directly from the generator to charge the battery.

Although illustrated as a separate component of a tubing string, the electromagnetic induction generator of FIGS. 5A-5D could be formed as part of downhole assembly or tool that it charges and runs, such as MWD and LWD assemblies.

A still further embodiment of the present invention that is illustrated in FIGS. 6A-6D may be similar to construction and operation to the electromagnetic induction generator illustrated in FIGS. 5A-5D except that the embodiment of the electromagnetic induction generator 50 illustrated in FIGS. 6A-6D may include a gear 80 positioned between tubular 70 and central cylinder 63 of spool 60. In this embodiment, the portion of each of tubular 70 and central cylinder 63 contacting gear 80 may be formed of teeth that mesh with the teeth on the external surface of the gear 80. In operation, the tubular 70 (and structures 61, 62 and associated Halbach arrays 65, 67) may be rotated and accordingly spool 60 rotated in a direction counter to that of the tubular by means of engagement thereof through gear 80. Such counter rotation of the conductive coil 68 and the Halbach arrays 65, 67 increases the electrical current generated by assembly 50.

Figure 7:
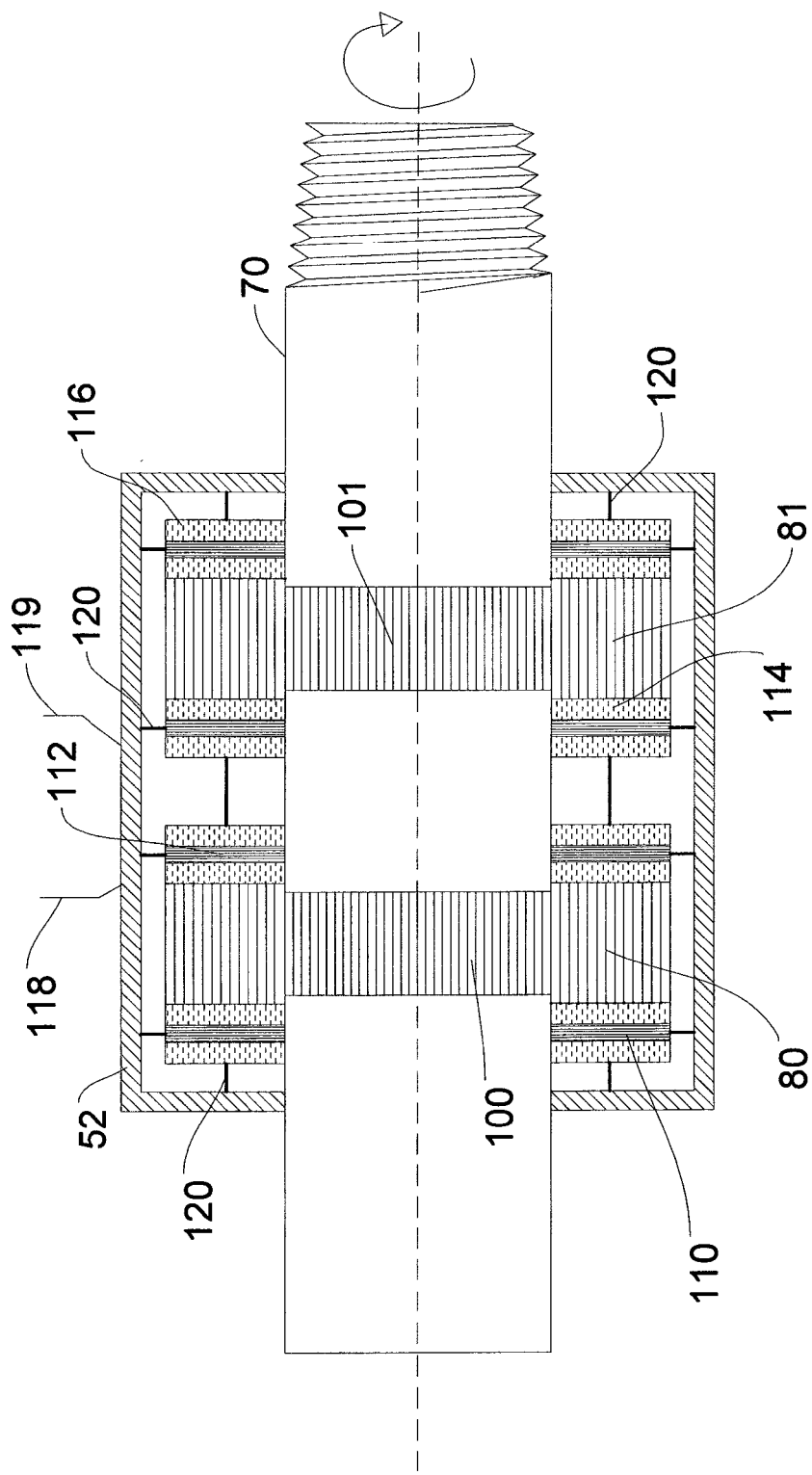
FIG. 7 is a partially cutaway, partially cross sectional view of a sub for use in a drill string in accordance with a still further embodiment of the present invention.

A still further embodiment of the present invention that is illustrated in FIG. 7 may be similar to construction and operation to the electromagnetic induction generator illustrated in FIGS. 6A-6D except that this embodiment would not include Halbach arrays and conductive coil arrangements that are concentric with tubular 70 as Halbach arrays 65 and 67 and conductive coil 68 are. Rather, the Halbach arrays 110, 112, 114 and 116 and conductive coil in this latest embodiment would be concentric with and of similar diameter to gears 80 and 81 and positioned in the annular space between tubular 70 and outer housing 52. It should be noted that if the diameter of gear 80 were increased, then the diameter of the concentric Halbach arrays and conductive coils may also be increased accordingly. In this embodiment, the electromagnetic induction generator may include a plurality of gears (80 and 81 as illustrated, although it is within the purview of the present invention to include more gears and associated Halbach arrays) in the annular space between tubular 70 and outer housing 52. Teeth 100 and 101 around the circumference of the tubular 70 engage corresponding teeth on the interior of annular gears 80 and 81 to rotate the Halbach arrays 110, 112, 114 and 116 that are connected to the gears 80, 81, respectively. The rotational speed and angular velocity of each gear in the plurality of gears would be significantly greater than the rotational speed and angular velocity of tubular 70 relative to the ratio of their diameters (gear effect). Each individual gear in the plurality of gears may be held in position immediately adjacent to tubular 70 by an axially oriented support rod (not illustrated) that would be connected by any suitable means to outer housing 52, so as to allow each gear to contact and counter rotate freely with tubular 70, but not contact outer housing 52. Accordingly, each individual gear 80, 81 in the plurality of gears would function to rotate an accompanying concentric Halbach arrays 110, 112, 114 and 116, respectively, proximal to an accompanying concentric, stationary conductive coil 120 located immediately adjacent in the axial direction, thereby collectively functioning as a plurality of electromagnetic induction generators in the annular space between tubular 70 and outer housing 52. Those skilled in the art will note that this arrangement of a plurality of electromagnetic induction generators can be scaled by repeating or stacking said plurality in the axial direction, thereby multiplying the effective current generated by the embodiment. One end of the conductive coil 120 may be connected to leads 118, 119 to carry the electric current to a means of utilization or storage. This generated current may be used to recharge downhole tool batteries or power other devices. Current may be passed to a capacitor or sent to ground when the current is not needed. Alternatively, a battery powered switch may be configured such that when a battery used in conjunction with a downhole assembly can no longer hold the switch open the switch closes, completing a circuit that allows stored charge from the capacitor or directly from the generator to charge the battery.

Certain embodiments of the methods of the invention are described herein. Additionally, although figures are provided that schematically show certain aspects of the methods of the present invention, these figures should not be viewed as limiting on any particular method of the invention. As used herein, spatial or directional terms such as "upper" and "lower", "upwardly" and "downwardly", "above" and "below" and other like terms indicating relative positions within a subterranean well or wellbore are used in this application to more clearly describe some embodiments of the invention. However, when applied to equipment and methods for use in subterranean wells and wellbores that are deviated from a vertical orientation, including horizontal, such terms may refer to positions within the deviated or horizontal plane, or other relationship as appropriate, rather than the vertical plane. For example, the term "above" as applied to a deviated or horizontal well or wellbore may refer to a position that is parallel to the surface of the earth along the well or wellbore than the point of reference.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed.

What is claimed is:
1. A process comprising:
  positioning an electromagnetic induction generator within a subterranean well bore, the electromagnetic induction generator being secured to a tubular positioned within the subterranean well bore and comprising a conductive coil secured to the exterior of the tubular and at least one Halbach array of magnets;

rotating the tubular so as to simultaneously rotate at least one gear and the at least one Halbach array of magnets in a direction opposite to the tubular to produce an electric current.

2. The process of claim 1 wherein said tubular is a drill string.

3. The process of claim 1 further comprising:
charging a battery of a downhole tool with the electric current.

4. The process of claim 1 further comprising:
powering a downhole tool with the electric current.

5. An assembly for use in a well bore comprising:
a housing having axially aligned openings therethrough;
a tubular capable of being connected within a string of tubulars and rotated and positioned through the housing via the aligned openings;
two Halbach arrays of magnets positioned within the housing and secured to the tubular, each Halbach array generating an axial magnetic field which is directed toward the other Halbach array so as to create a generally cylindrically shaped internal magnetic field; and
a conductive coil secured to the housing and positioned on the exterior of the tubular within the housing and the internal magnetic field.

6. The assembly of claim 5 further comprising:
grooved flow channels in an outer surface of the housing to provide opposing resistance to fluid flowing past the housing and thereby providing torque and a rotational force to the housing so as to at least inhibit rotation of the housing.

7. The assembly of claim 6 wherein the grooves have a helical configuration.

8. The assembly of claim 5 further comprising:
a gear positioned between the tubular and the housing so as to rotate the conductive coil counter to the direction in which the tubular and two Halbach arrays are rotated.

9. The assembly of claim 5 wherein at least one end of the tubular is secured to a drill string.

10. An assembly for use in a well bore comprising:
a housing having axially aligned openings therethrough;
a tubular capable of being rotated and positioned through the housing via the aligned openings, said tubular having at least one first set of teeth extending about substantially the entire outer circumference thereof;
at least one gear having a generally annular shape and being positioned within said housing, said at least one gear having a second set of teeth extending about substantially the entire inner circumference thereof and meshing with said at least one first set of teeth when positioned between said housing and said tubular;
at least one set of generally annular Halbach arrays positioned within said housing so as to be generally concentric with and secured to said at least one gear, the at least one set of generally annular Halbach arrays generating a magnetic field;
a conductive coil positioned on the exterior of the tubular within the housing and the magnetic field; and
electrical leads connected to an end of the conductive coil to carry electric current from said assembly for usage, storage or both usage and storage.

11. The assembly of claim 10 wherein at least a plurality of generally annular gears are positioned within said housing between said tubular and said housing, each of said plurality of gears having a separate set of the at least one set of generally annular Halbach arrays secured thereto.

12. An assembly for use in a well bore comprising:
a housing having axially aligned openings therethrough;
a tubular capable of being connected within a string of tubulars and rotated and positioned through the housing via the aligned openings;
two Halbach arrays of magnets positioned within the housing and secured to the housing, each Halbach array generating an axial magnetic field which is directed toward the other Halbach array so as to create a generally cylindrically shaped internal magnetic field; and
a conductive coil secured to the tubular and positioned on the exterior of the tubular within the housing and the internal magnetic field.

13. The assembly of claim 12 further comprising:
a gear positioned between the tubular and the housing so as to rotate the two Halbach arrays counter to the direction in which the tubular and conductive coil are rotated.

14. The assembly of claim 12 further comprising:
grooved flow channels in an outer surface of the housing to provide opposing resistance to fluid flowing past the housing and thereby providing torque and a rotational force to the housing so as to at least inhibit rotation of the housing.

* * * * *